D. SULLIVAN.
HANDLE FASTENER.
APPLICATION FILED FEB. 27, 1914.
1,124,073.
Patented Jan. 5, 1915.
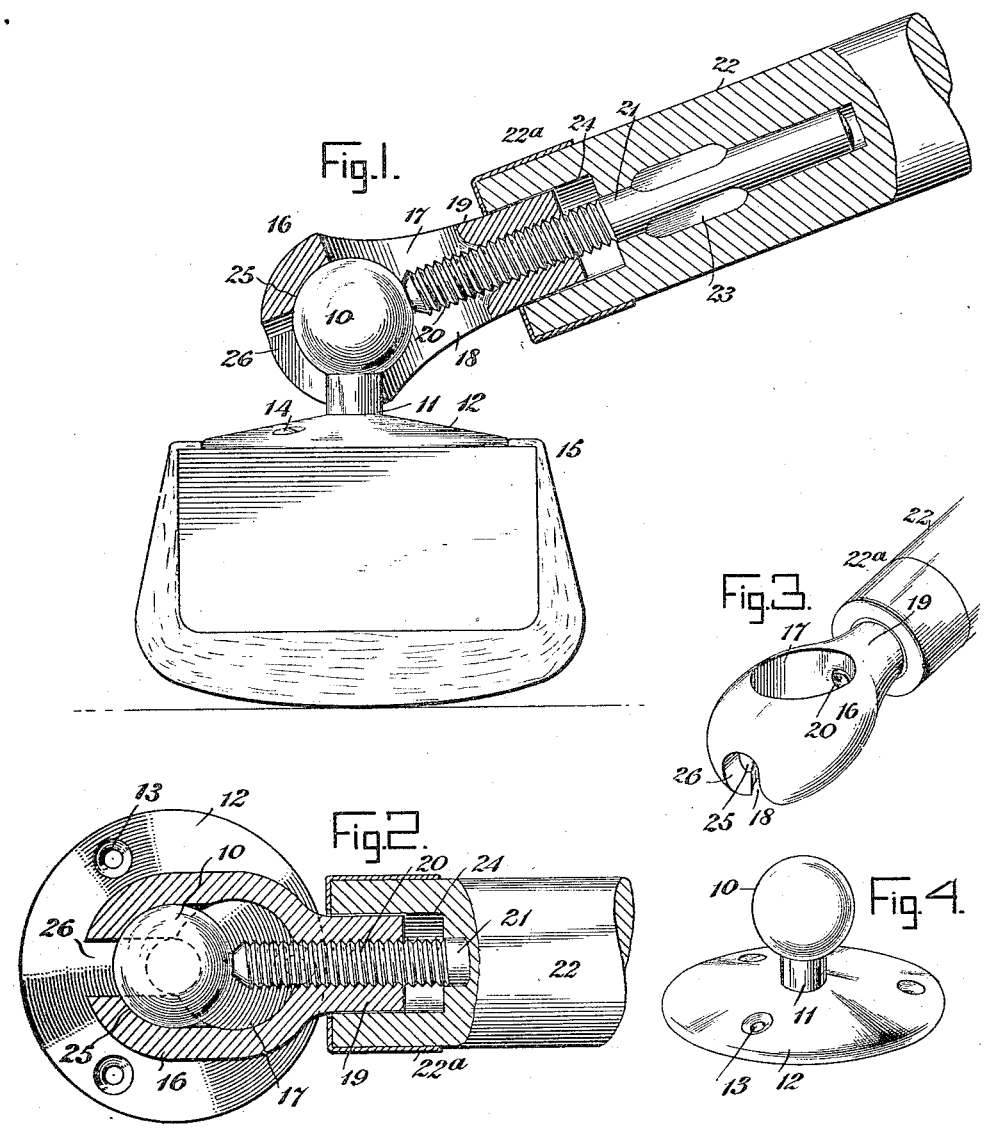
WITNESSES
INVENTOR
Daniel Sullivan
BY
ATTORNEYS

UNITED STATES PATENT OFFICE.

DANIEL SULLIVAN, OF FLINT, MICHIGAN.

HANDLE-FASTENER.

1,124,073.  Specification of Letters Patent.  Patented Jan. 5, 1915.

Application filed February 27, 1914. Serial No. 821,447.

*To all whom it may concern:*

Be it known that I, DANIEL SULLIVAN, a citizen of the United States, and a resident of Flint, in the county of Genesee and State of Michigan, have invented a new and Improved Handle-Fastener, of which the following is a full, clear, and exact description.

My invention relates more particularly to a ball and socket fastener especially adapted for adjustably connecting a handle to a brush or the like.

An object of my invention is to provide a fastener of the indicated character which will rigidly secure the handle in adjusted position.

The invention also has for its object to provide a handle fastener, improved in various particulars with respect to strength and efficiency, and with a view to promote convenience in assembling the parts, and simplicity of adjustment and control.

The invention resides in the novel features characterizing the distinctive construction and arrangement of the parts.

Reference is to be had to the accompanying drawings forming a part of this specification, in which similar characters of reference indicate corresponding parts in all the views.

Figure 1 is a longitudinal vertical section of a handle fastener embodying my invention; Fig. 2 is a perspective longitudinal section; Fig. 3 is a perspective view of the socket member; and Fig. 4 is a perspective view of the ball member.

In constructing a practical embodiment of the invention as illustrated, a ball member 10 is provided on a short stem 11, which is in fixed relation to an attaching base 12, which may be formed with holes 13 for receiving screws or equivalent fastening devices 14, for attaching the base to a brush 15 or the like article.

A socket designated generally by the numeral 16, is formed with a chamber 17, here shown as open at the top and bottom, and which in any event will have an opening or open side 18 for the entrance or removal of the ball head 10. At the rear end the socket is formed with an internally threaded nipple 19, taking into which is a clamp screw 20. The clamp screw is formed with a shank 21 attachable to a handle 22. As here shown, the shank has ribs or lugs 23 along the sides thereof, so that when the shank is driven into the handle it will turn with the latter, it being understood that any equivalent means may be provided for attaching the screw to the handle. The threaded nipple 19 is received in a counterbore or recess 24 in the handle. The handle may have the usual ferrule 22ª.

Upon the turning of the handle the threaded engagement of the clamp screw with the nipple 19 will move the socket longitudinally, giving a relative movement to the clamp screw, so that the latter may be caused to intrude into the chamber 17 of the socket, to bind against the ball head 10 and jam the same tightly against the front of the socket.

In order that the clamping effect of the screw will rigidly hold the ball against the socket, I form in the latter, in the front wall thereof, a concave depression 25, which is complementary to the chamber 17 and conforms approximately to the curvature of the ball, whereby the latter will have a contact with the socket for approximately one half the total surface of the ball. The socket is further formed with a slot 26 in the front wall thereof, extending from the entrance opening 18 of the chamber 17, and adapted to accommodate the shank 11 of the ball head. The depression 25 extends at both sides and above the slot 26, and is opposite the threaded nipple 19 and the clamp screw 20.

By the described arrangement a very wide range of adjustment may be conveniently effected in the relative positions of the brush and handle; for instance, the brush may be disposed in a plane parallel with the handle, and then may be turned in its own plane. In addition, the brush by reason of the slot 26 may assume various angular positions relatively to the handle, and may turn in any given plane while the shank 11 of the ball head is in the said slot 26. In whatever position the brush is given the clamp screw will be effective in firmly and rigidly binding the ball head in the socket, it being only necessary to obtain the adjustment to turn the handle and loosen the clamp screw to permit a shifting of the brush in the ball head relatively to the socket.

Having thus described my invention, I claim as new and desire to secure by Letters Patent:

1. A handle fastener comprising a ball head having a shank and an attaching base; a socket having a tubular, internally threaded nipple at the rear end; and a clamp screw taking into the nipple and having a shank adapted for attachment to a handle, said socket having a chamber for receiving the head, and having also a transverse opening intersecting the chamber for the entrance and removal of the head, a slot in the front wall extending from the said transverse opening forwardly to the front, and adapted to accommodate the shank of the base, and a depression in the inner side of the front wall at the slot complementary to the chamber and in line with the clamp screw.

2. A handle fastener comprising a ball head formed with a shank and means for attaching the same; a socket having a tubular, internally threaded nipple at the rear end; and a clamp screw taking into the threaded nipple and adapted to intrude into the chamber, the screw having a shank adapted for attachment to a handle, said socket having a chamber for receiving the head, said chamber having an opening transverse to the screw for the entrance and removal of the head, a slot extending forwardly from the opening to accommodate the movement, and a depression in the front wall complementary to the chamber.

In testimony whereof I have signed my name to this specification in the presence of two subscribing witnesses.

DANIEL SULLIVAN.

Witnesses:
W. L. DEVORE,
CHARLES A. SULLIVAN.

Copies of this patent may be obtained for five cents each, by addressing the "Commissioner of Patents, Washington, D. C."